UNITED STATES PATENT OFFICE.

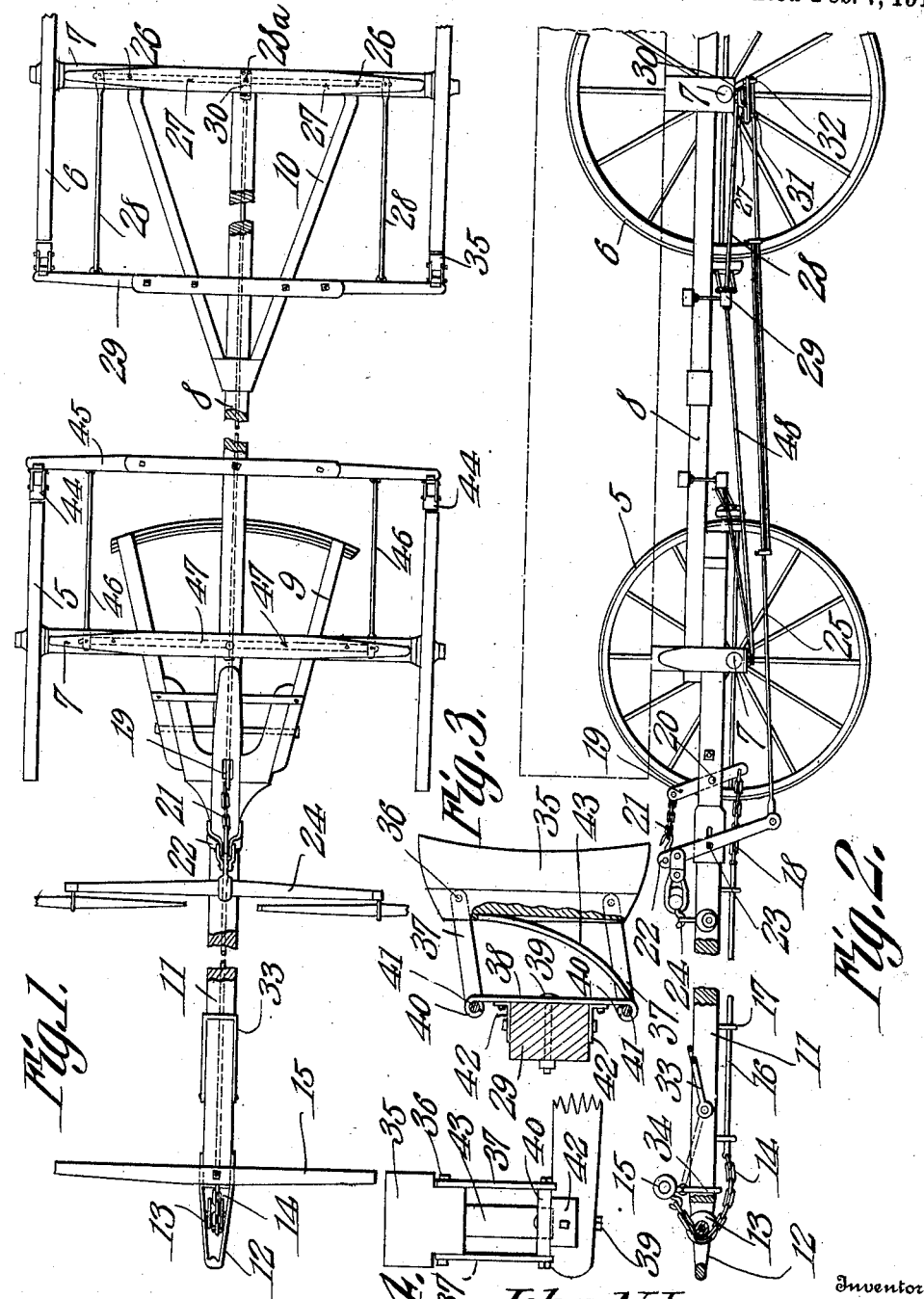

JOHN N. LAWRENCE, OF NEVADA, MISSOURI.

AUTOMATIC VEHICLE-BRAKE.

983,294.   Specification of Letters Patent.   Patented Feb. 7, 1911.

Application filed March 15, 1909. Serial No. 483,465.

*To all whom it may concern:*

Be it known that I, JOHN N. LAWRENCE, a citizen of the United States, residing at Nevada, in the county of Vernon and State of Missouri, have invented a new and useful Automatic Vehicle-Brake, of which the following is a specification.

This invention relates to that class of automatic vehicle brakes which are operated by the holding back of the team in descending a hill. A brake mechanism of this kind is shown in my Patent No. 841,698, dated January 22, 1907, and it is the object of the present invention to improve the same, more particularly with respect to the means whereby the application of the brake is prevented when the vehicle is backing.

With the foregoing object in view, the invention consists in a novel construction and arrangement of parts to be hereinafter described and claimed, reference being had to the drawing hereto annexed forming a part of this specification, in which drawing—

Figure 1 is a plan view of a vehicle equipped with the improved brake mechanism. Fig. 2 is a side elevation thereof partly broken away. Fig. 3 is a side elevation of the brake shoe and its connection with the brake beam. Fig. 4 is a plan view of the parts shown in the preceding figure.

Referring to the drawing, the running gear of a farm wagon of the extension type is shown, the same comprising front and rear wheels 5 and 6 respectively, axles 7, a coupling pole or reach 8, front hounds 9, and hind hounds 10. The wagon is of ordinary construction, and the invention is not limited by the same.

Secured to and projecting from the outer end of the tongue 11 of the vehicle, is a yoke 12 in which is journaled a sheave 13 arranged to rotate on a horizontal axis. Around this sheave passes a chain or cable 14 one end of which connects with neck yoke 15, and the other end with a rod 16 slidably mounted in guides 17 on the under side of the tongue. This rod is connected by a short section of chain 18 to one end of a lever 19 pivoted at 20 in a slot made in the tongue, the pivot being horizontal, and the lever therefore swinging in a vertical plane. The other end of this lever is connected by a short section of chain 21 to the upper end of a lever 22 pivoted at 23 in a slot in the tongue, and swinging parallel with the lever 19. To this end of the lever is also connected the double tree or other draft device 24.

To the lower end of the lever 22 is connected one end of a rod 25, which rod is in two sections adjustably connected in any suitable manner so that the same may be lengthened or shortened as the wagon is lengthened or shortened. This lever serves to transmit the motion of the lever 22 to the brake levers.

To the under side of the rear axle 7 is pivoted at 26 a pair of oppositely extending levers 27 which are connected at one of their ends by links 28 to the brake beams 29. The other ends of the levers 27 are formed with slots through which passes a pin $28^a$ carried by a coupling member 30 to which the rod 25 is connected. This coupling member is a plate which is bent upon itself to form upper and lower members between which the slotted ends of the levers 27 loosely fit and are connected to the pin $28^a$ which is carried by said coupling member. The coupling member also carries U-bolts 31, the looped portions of which depend therefrom, and receive the rod 25, said rod being rigidly secured to the coupling member upon tightening up the U-bolts. By this arrangement of links and levers, when the team pulls forwardly, the rod 25 moves rearwardly, thereby causing the brake-beam 29 to move away from the wheels so as to release the brake shoes. However, when a rearward pull is had on the neck yoke, the rod 25 is moved forwardly, thereby setting the brakes.

In a brake mechanism of this character provision must be made for enabling the team to back the vehicle on occasion without causing the application of the brake. One method of doing this is to employ a U-shaped lever 33 pivoted on the tongue at a point located to the rear of the neck yoke 15. When it is desired to throw the brake out of commission this lever is swung to the position shown in dotted lines in Fig. 2, so that the free end thereof will lie to the rear of and engage the neck yoke ring 34, whereupon said ring is locked on the tongue and the vehicle may then be backed without imparting movement to the herein described system of links and levers, and the brake will therefore not be applied. I also provide a mechanism whereby the application of the brakes when the vehicle is backing is automatically prevented. This mechanism will now be described.

To the side of the brake shoe 35 adjacent to the upper and lower ends thereof, are pivoted at 36 one end of links 37, the other end of said links being pivotally connected to a supporting frame or bracket which is secured to that side of the brake beam 29 which faces the brake shoe 35, by a bolt 39. The supporting frame is a plate 38 which has its upper and lower edges turned over to form eyes 40 which support rods 41 to which the links 37 are pivotally connected. The plate 38 is further secured to the brake beam by angular plates 42 secured to the plate 38 and to the beam at the top and bottom thereof. A brace 43 is fastened at one end to the bottom portion of the plate 38 by the rod 41, from which it extends at an upward slant to the back of the brake shoe into a vertical slot made therein, in which slot the said end of the brace loosely works. The function of this brace is to normally hold the brake shoe in spaced relation with the brake beam. The links 37 are inclined slightly from the horizontal in such a direction that when the brake shoe moves downwardly, it also advances forwardly in the direction of the wheel, and when it is swung upwardly it moves away from the wheel. The brake shoes therefore have a movement independent of the movement of the brake beam, the only function of the latter being to initially engage the brake shoes with the wheels, after which the forward turning movement thereof automatically applies the brake shoes. When the vehicle is backing and the wheels therefore turning in the opposite direction, the frictional contact of the wheels with the brake shoes swing the latter upwardly in a direction away from the wheels, so that no braking action takes place.

It will therefore be seen that the application of the brakes depends on the direction in which the wheels are turning, and it is not necessary to lock the neck yoke 15 when it is desired to back the vehicle.

Although I have shown and described the preferred embodiment of my invention, it will be understood that minor changes may be resorted to without departing from the spirit or scope of the invention, and I do not wish to be limited except as indicated in the appended claim.

The front wheels are also provided with brakes comprising shoes 44 mounted on a beam 45 in the same manner as the shoes 35. This beam is operated through links 46 and levers 47, the latter being pivoted to the front axle and connected by a rod 48 to the rear brake beam 29 so that when the latter moves in a direction to apply the rear brakes, the front brakes will also be applied. Inasmuch as the brake shoes are presented in the opposite direction from the shoes 35, the links connecting said shoes 44 to the beam 45 are also inclined in the opposite direction in order that the hereindescribed automatic binding and releasing action may be had.

What is claimed is:

In a brake, a beam, a shoe, spaced parallel links pivotally connecting the shoe to the beam in spaced relation therewith, the back of the shoe which is opposite the beam having a vertical slot, and a brace member carried by the beam, and extending loosely into the slot of the shoe.

In testimony that I claim the foregoing as my own, I have hereto affixed my signature in the presence of two witnesses.

JOHN N. LAWRENCE.

Witnesses:
 WOODDY SWEARINGEN,
 LOYD ANCHORS.